US012322362B2

(12) United States Patent
Lai

(10) Patent No.: US 12,322,362 B2
(45) Date of Patent: Jun. 3, 2025

(54) MUSIC BOX

(71) Applicant: JEAN CULTURAL & CREATIVE CO., LTD., New Taipei (TW)

(72) Inventor: Ming-Te Lai, New Taipei (TW)

(73) Assignee: JEAN CULTURAL & CREATIVE CO., LTD., New Taipei (TW)

( * ) Notice: Subject to any disclaimer, the term of this patent is extended or adjusted under 35 U.S.C. 154(b) by 225 days.

(21) Appl. No.: 18/334,020

(22) Filed: Jun. 13, 2023

(65) Prior Publication Data

US 2024/0054979 A1 Feb. 15, 2024

(30) Foreign Application Priority Data

Aug. 11, 2022 (TW) ................................ 111208723

(51) Int. Cl.
*G10F 5/02* (2006.01)
*G10F 1/06* (2006.01)
*G10F 5/06* (2006.01)

(52) U.S. Cl.
CPC .................. *G10F 5/02* (2013.01); *G10F 1/06* (2013.01); *G10F 5/06* (2013.01)

(58) Field of Classification Search
CPC ................. G10F 5/02; G10F 1/06; G10F 5/06
See application file for complete search history.

(56) References Cited

U.S. PATENT DOCUMENTS 2,504,918 A * 4/1950 Bergen ...................... G10F 1/06 984/204
4,193,648 A * 3/1980 Gargiulo ................... G10F 1/06 984/204
4,459,893 A * 7/1984 Kitamura .................. G10F 1/06 984/204
4,464,969 A * 8/1984 Isaka ......................... G10F 1/06 984/204
4,466,328 A * 8/1984 Kitamura .................. G10F 1/06 984/204
5,446,235 A * 8/1995 Shih .......................... G10F 1/06 84/95.2
5,700,963 A * 12/1997 Koelemeijer ............. G10F 1/06 84/95.1
5,869,779 A * 2/1999 Kraisrisinsuk ............ G10F 1/06 84/94.1

(Continued)

FOREIGN PATENT DOCUMENTS

DE 202006015988 U1 * 3/2007 ............... G10F 1/06

*Primary Examiner* — Robert W Horn
(74) *Attorney, Agent, or Firm* — Rabin & Berdo, P.C.

(57) ABSTRACT

A music box includes a sounding mechanism and a pause mechanism. The pause mechanism has a guide sleeve, a stopper member, a pushbutton, a guide assembly and a restoring spring. The guide sleeve is formed with a plurality of initial locating sections, a plurality of stop locating sections and a communicating ring section. The stopper member can be moved and rotated as well as has a stop block. The pushbutton serves to push the stopper member to move in a forward direction. The guide assembly serves to drive the stopper member to rotate, while the restoring spring serves to push the stopper member to move in a backward direction. By means of the pushbutton, the guide assembly and the restoring spring, the stop block can in turn move between the initial locating sections, the stop locating sections and the communication section.

5 Claims, 19 Drawing Sheets

(56) References Cited

U.S. PATENT DOCUMENTS

| | | | | |
|---|---|---|---|---|
| 6,262,352 | B1 * | 7/2001 | Liu | G10F 1/06 84/95.2 |
| 7,321,090 | B2 * | 1/2008 | Meng-Suen | G10F 1/06 84/94.1 |
| 2024/0054979 | A1 * | 2/2024 | Lai | G10F 1/06 |

* cited by examiner

MUSIC BOX

FIELD OF THE INVENTION

The present invention relates generally to a music box for playing music, and more particularly to a music box, which can pause from playing music.

BACKGROUND OF THE INVENTION

The existing music boxes on the market can be substantially classified into cylinder music boxes and disc music boxes. A conventional music box is mainly composed of a clockwork spring, a sound comb and a cylinder. The clockwork spring can be wound up to drive and rotate the cylinder. The sound comb has multiple metal reeds with different lengths so that the sound comb has the form of a comb. Multiple pins protrude from outer circumference of the cylinder. When the cylinder is driven by the clockwork spring to rotate, the pins of the cylinder pluck the metal reeds of the sound comb, whereby the metal reeds vibrate to emit sounds of different frequencies.

However, the existing music box will play music only after the clockwork spring is wound up and the music playing time of the music box is limited to the rotation time of the clockwork spring. Therefore, once the clockwork spring stops rotating, the music box also stops playing music. For making the music box play music again, it is necessary to manually wind up the clockwork spring and rotate the cylinder again. Moreover, after the cylinder starts to rotate, it is impossible to halt the cylinder so that it is impossible to make the music box pause from playing music.

SUMMARY OF THE INVENTION

A primary object of the present invention to provide a music box, which is additionally equipped with a pause mechanism. After the music box starts to play music, the pause mechanism can be used to make the music box pause from playing music. This enhances the convenience in playing music with the music box.

To achieve the above and other objects, the music box of the present invention includes a box body, a sounding mechanism and a pause mechanism. The sounding mechanism is mounted in the box body and has a clockwork spring, a cylinder and a comb reed. The clockwork spring is rotatable to drive the cylinder to pluck the comb reed, so that the comb reed is capable of emitting sounds and playing music.

The pause mechanism includes a guide sleeve, a stopper member, a pushbutton, a guide assembly and a restoring spring. The guide sleeve is connected with the box body. A column space and a locating ring space around the column space are defined in the guide sleeve. A plurality of initial locating sections and a plurality of stop locating sections are alternately arranged in the locating ring space for surrounding the column space. A communicating ring section of the locating ring space is in communication with the initial locating sections and the stop locating sections.

The stopper member is movably assembled in the column space. The stopper member is capable of being moved and rotated as well as having a stop block, and the stop block is movable between the initial locating sections, the stop locating sections and the communicating ring section. The stop block is selectively stopped by one of the initial locating section and the stop locating section, so that the stopper member is kept in an abutting position to restrict the clockwork spring from rotating or in a standby position to permit the clockwork spring to rotate.

The pushbutton is movably assembled in the column space for pushing the stopper member to move in a forward direction, whereby the stop block is capable of moving from one of the initial locating section and the stop locating section to the communicating ring section.

The guide assembly has a first guide section forming on the stopper member and a second guide section forming on the pushbutton. The first guide section is pushed by the second guide section for rotating the stopper member, so that the stop block will be moved from one of the initial locating section and the stop locating section into the other of the initial locating section and the stop locating section through the communicating ring section.

The restoring spring is disposed between the guide sleeve and the stopper member for pushing the stopper member to move in a backward direction reverse to the forward direction, so that the stop block is capable of being moved from the communicating ring section to one of the initial locating section and the stop locating section.

In the above music box, each of the initial locating sections has a stopping recess for making the stop block stay in the standby position, a blocking wall surface forming adjacent to one side of the stopping recess and a guiding incline surface forming adjacent to another side of the stopping recess. When the stop block is contact with the guiding incline surface, the stop block will be moved by the guiding incline surface toward the guiding incline surface, then the stop block is blocked by the blocking wall surface and is moved into the stopping recess. Each of the stop locating sections has a stopping wall surface for making the stop block stay in the abutting position and a stop guiding incline surface for moving the stop block toward the stopping wall surface. A height of the stopping wall surface is lower than that of the stopping recess. Two ends of the stopping wall surface are respectively adjacent to the guiding incline surface and the stop guiding incline surface.

Moreover, the guide sleeve further has a restriction groove in communication with both of the column space and the locating ring space. A restriction block is disposed on the pushbutton for entering the restriction groove, so that the restriction groove is capable of being cooperated with the restriction block for restricting the pushbutton to move linearly relative to the guide sleeve. Two engagement arms are extended from the stopper member for inserting the pushbutton, and an engagement block is protruded from the engagement arms. An engagement space is formed in the pushbutton and an engagement groove is recessed from the engagement space. The engagement arms is capable of being fitted into the engagement space to make the engagement block engaged in the engagement groove.

The present invention is characterized in that the pause mechanism includes the guide sleeve, the stopper member, the pushbutton, the guide assembly and the restoring spring. Multiple initial locating sections, multiple stop locating sections and the communicating ring section are formed in the guide sleeve. The initial locating sections and the stop locating sections are alternately annularly arranged along the interior of the guide sleeve.

In addition, the initial locating sections and the stop locating sections are all in communication with the communicating ring section. The stopper member is movably assembled in the column space. The stop block of the stopper member is movable between the initial locating sections, the stop locating sections and the communicating ring section. The guide assembly serves to drive the stopper member to rotate, whereby the stop block can move within the communicating ring section to get close to the initial locating sections or the stop locating sections. The pushbutton serves to push the stopper member to move in a forward direction, whereby the stop block can move from one of the initial locating section and the stop locating section to the communicating ring section. The restoring spring serves to push the stopper member to move in a backward direction, whereby the stop block can move from the communicating ring section to the other of the initial locating section and the stop locating section. By means of the pushbutton, the guide assembly and the restoring spring, the stop block can in turn move into the initial locating sections or the stop locating sections. Accordingly, the stopper member can be positioned in the abutting position to restrict the clockwork spring from rotating or positioned in the standby position to permit the clockwork spring to rotate. Therefore, after the music box starts to play music, the pause mechanism can make the music box pause from playing music. This enhances the convenience in playing music with the music box.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
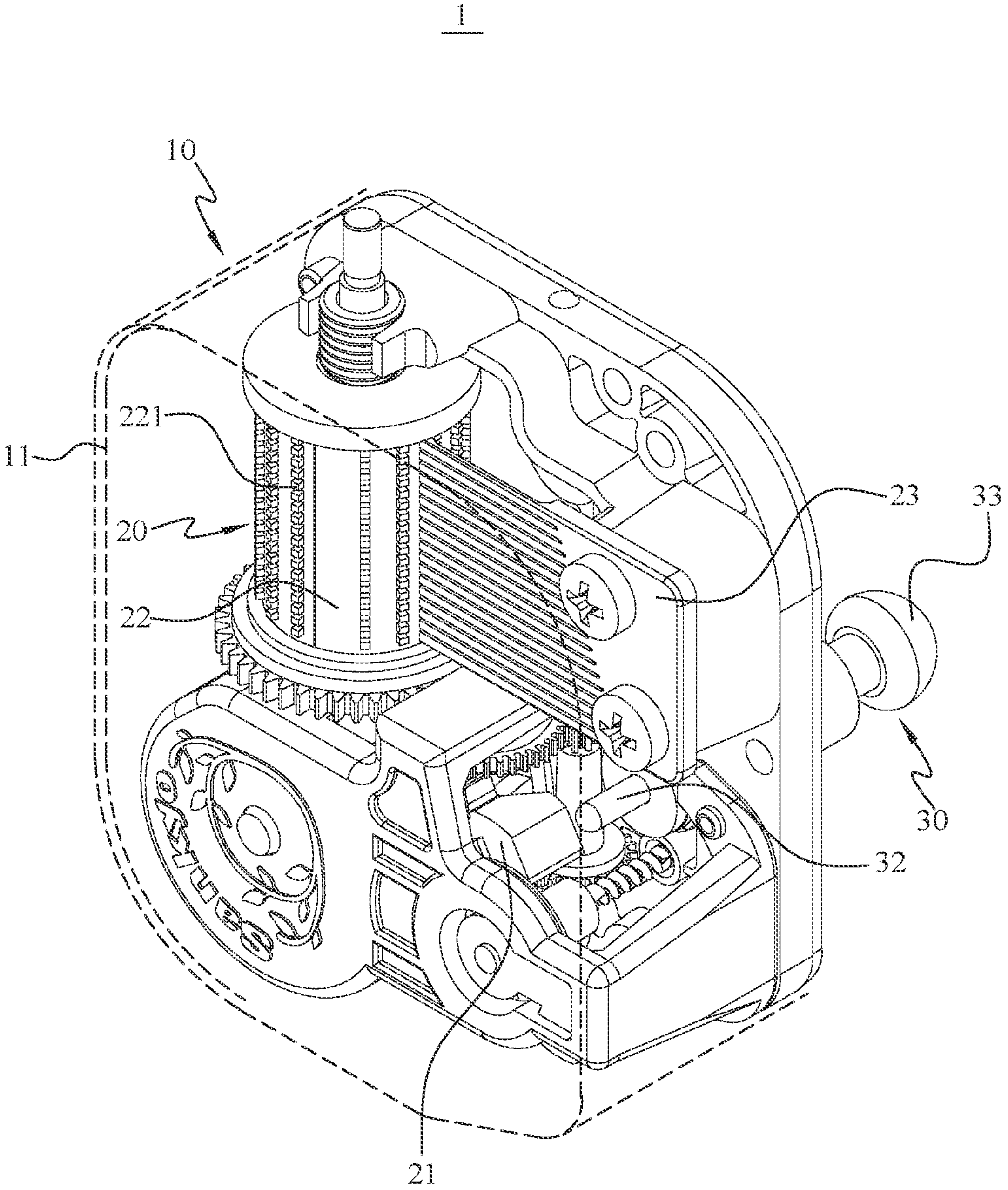
FIG. 1 is a perspective assembled view of the music box of the present invention.
Figure 2:
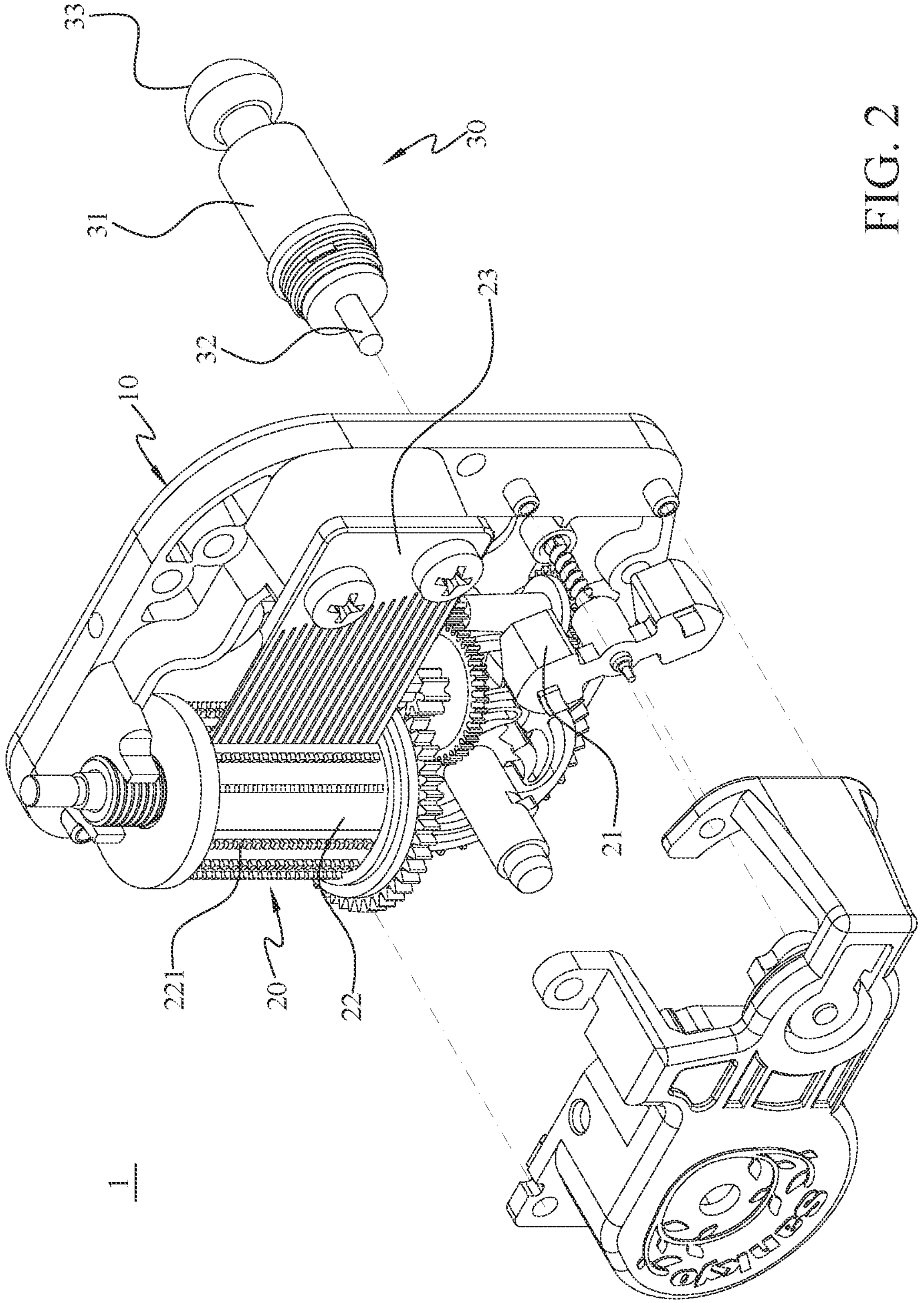
FIG. 2 is a perspective exploded view of the music box of the present invention.

Please refer to FIGS. 1 and 2. The music box 1 of the present invention is mainly composed of a box body 10, a sounding mechanism 20 and a pause mechanism 30. The box body 10 is in the form of a hollow body having an internal sounding space 11. The sounding mechanism 20 is mounted in the sounding space 11 and has a clockwork spring 21, a cylinder 22 and a comb reed 23. Both the clockwork spring 21 and the cylinder 22 are rotatable relative to the box body 10. In addition, the clockwork spring 21 and the cylinder 22 are assembled with each other, whereby when the clockwork spring 21 is unwound, the cylinder 22 is driven by the clockwork spring 21 to rotate. A plurality of pins 221 are disposed on a circumference of the cylinder 22. The comb reed 23 is positioned in adjacency to the cylinder 22, whereby when the cylinder 22 is rotated, the pins 221 of the cylinder 22 pluck the comb reed 23 to emit sounds and play music.

Figure 3:
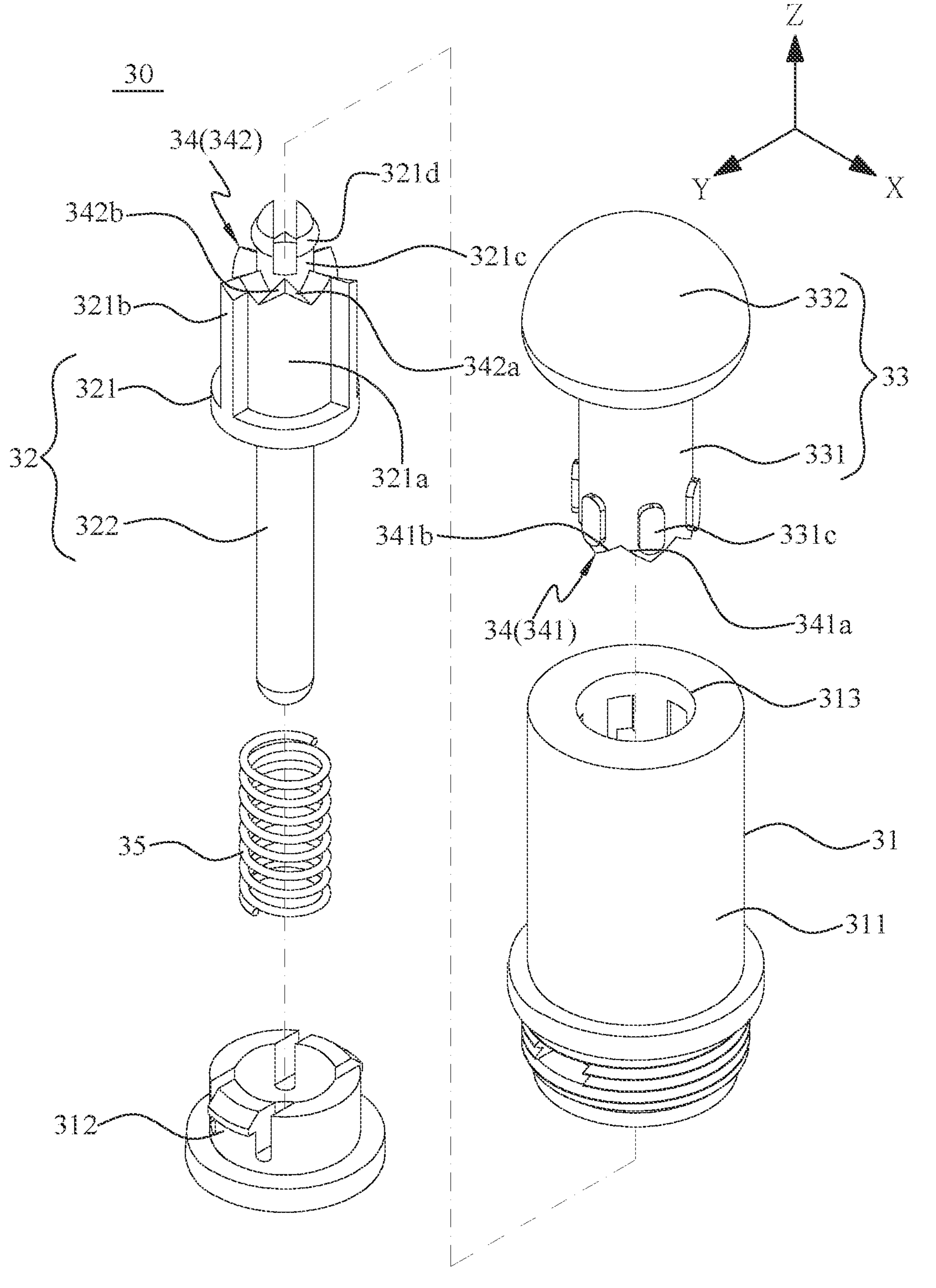
FIG. 3 is a perspective exploded view of the pause mechanism of the music box of the present invention.

Please refer to FIGS. 2 and 3. The pause mechanism 30 has a guide sleeve 31, a stopper member 32, a pushbutton 33, a guide assembly 34 and a restoring spring 35. Referring to FIGS. 3-6, the guide sleeve 31 has a sleeve body 311 screwed on the box body 10 and a cap body 312 fitted with one end of the sleeve body 311. The sleeve body 311 is in the form of a hollow body. In this embodiment, a column space 313 and a locating ring space 314 are defined in the sleeve body 311. In addition, a plurality of restriction grooves 315 are disposed in the sleeve body 311. The column space 313 is positioned at a central section of the sleeve body 311, while the locating ring space 314 is positioned around the column space 313. As shown in the drawings, a plurality of initial locating sections **314*a* and a plurality of stop locating sections 314*b* are disposed in the locating ring space 314 around an upper half portion of the column space 313. In addition, a communicating ring section 314*c* is disposed in the locating ring space 314 around a lower half portion of the column space 313 in communication with both of the initial locating sections 314*a* and the stop locating sections 314*b*. The initial locating sections 314*a* and the stop locating sections 314*b* are alternately annularly arranged around the column space 313, whereby there is a stop locating section 314*b* between each two adjacent initial locating sections 314*a*. Moreover, the restriction grooves 315 of the guide sleeve 31 are positioned above the communicating ring section 314*c*. The restriction grooves 315 are annularly arranged around the column space 313 at intervals, whereby some of the restriction grooves 315 are one by one pair on the initial locating sections 314*a*, while the others of the restriction grooves 315 are one by one pair on the stop locating section 314*b***.

As shown in the drawings, each initial locating sections **314*a* of the locating ring space 314 has a guiding incline surface 314*a*1, a blocking wall surface 314*a*2 and a stopping recess 314*a*3. The guiding incline surface 314*a*1 and the blocking wall surface 314*a*2** are arranged at intervals.

In addition, the guiding incline surface **314*a*1 is formed in adjacency to a lowermost section of the stopping recess 314*a*3. One end of the blocking wall surface 314*a*2 is connected with the guiding incline surface 314*a*1, whereby a height of the guiding incline surface 314*a*1 is lower than that of the stopping recess 314*a*3. Moreover, the stop locating sections 314*b* has a stop guiding incline surface 314*b*1 and a stopping wall surface 314*b*2. Two ends of the stop guiding incline surface 314*b*1 are respectively adjacent to the blocking wall surface 314*a*2 and the stopping wall surface 314*b*2. One end of the stopping wall surface 314*b*2 far away the stop guiding incline surface 314*b*1 is adjacent to the guiding incline surface 314*a*1. The height of the stop guiding incline surface 314*b*1 and the stopping wall surface 314*b*2 are lower than that of the stopping recess 314*a*3**.

Figure 4:
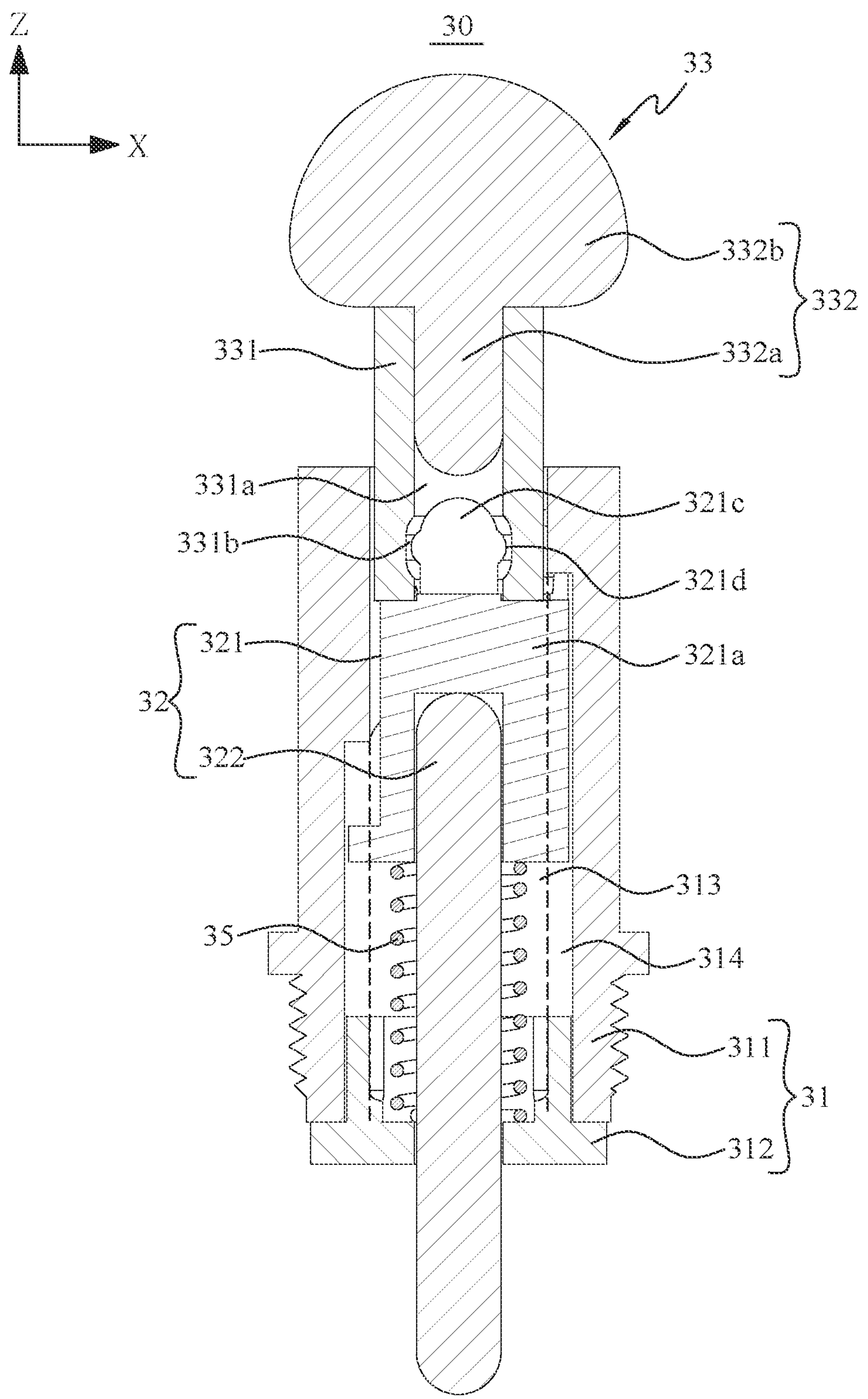
FIG. 4 is a sectional view of the pause mechanism of the music box of the present invention.
Figure 5:
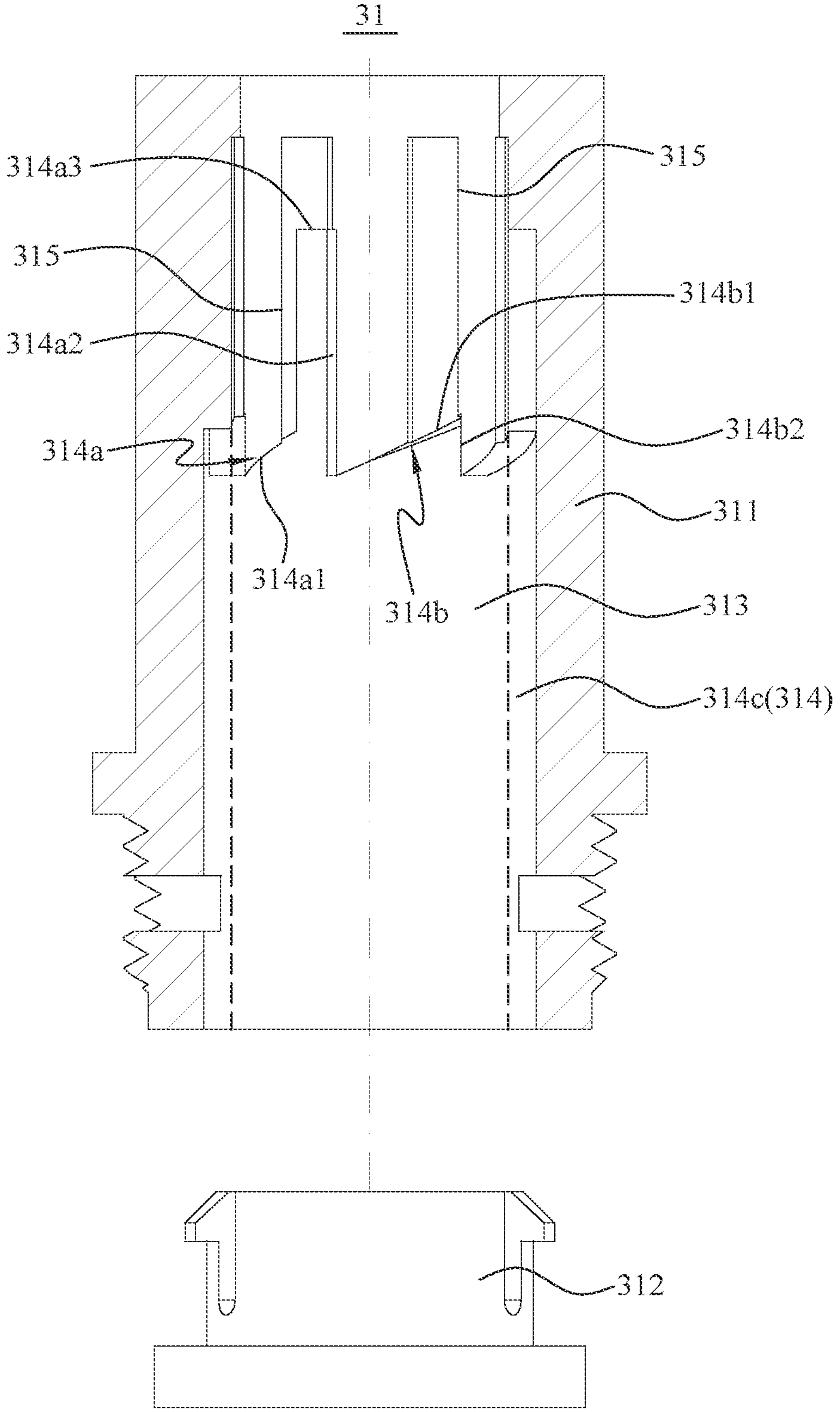
FIG. 5 is an exploded view of the guide sleeve of the music box of the present invention.
Figure 6:
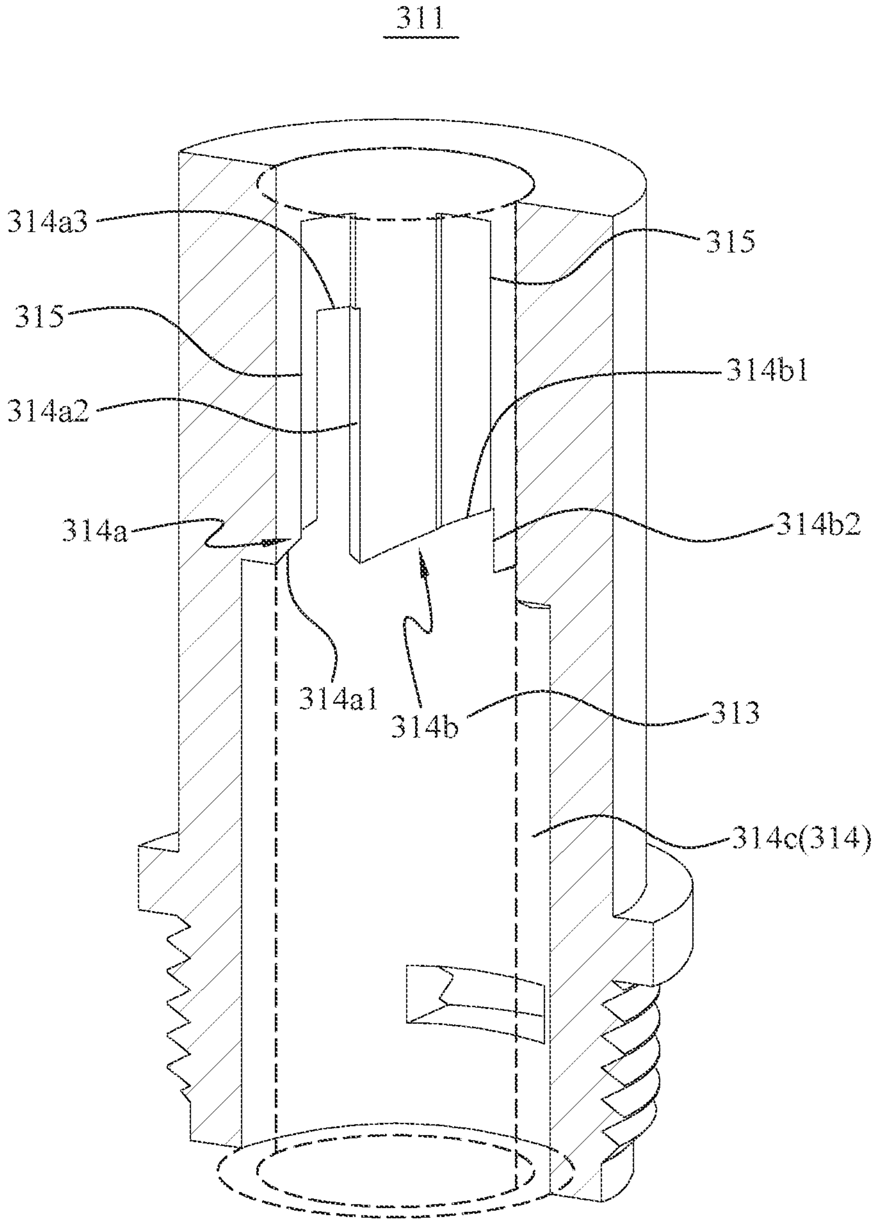
FIG. 6 is a sectional view of the sleeve body of the guide sleeve according to FIG. 5.
Figure 7:
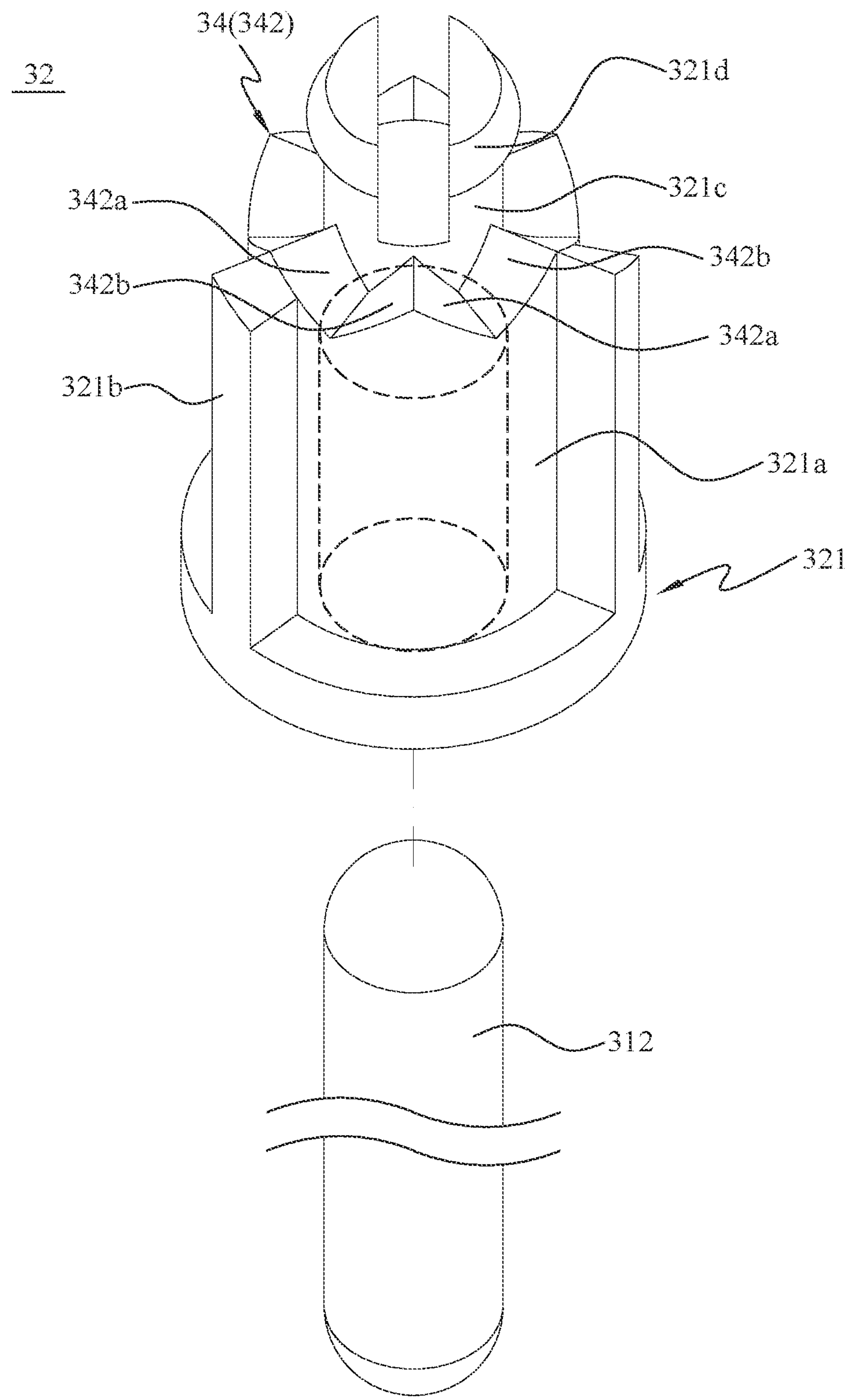
FIG. 7 is a perspective exploded view of the stopper member of the music box of the present invention.

Please refer to FIGS. 3, 4 and 7. The stopper member 32 of the pause mechanism 30 includes a stop column 321 and a stop rod 322. In this embodiment, the stop column 321 has a substantially cylindrical stop main body **321*a* and a plurality of stop blocks 321*b* extending from a circumference of the stop main body 321*a*. The stop blocks 321*b* are annularly arranged along the circumference of the stop main body 321*a* at equal intervals. In addition, two engagement arms 321*c* are longitudinally extend from an upper side of the stop main body 321*a* of the stop column 321. The engagement arms 321*c* are arranged at intervals. Each of the engagement arms 321*c* is formed with a transversely extending engagement block 321*d*. A part of the stop rod 322 extends from a lower side of the stop column 321 into the stop column 321, while the remaining part of the stop rod 322 is positioned under the stop column 321**.

As shown in the drawings, the stopper member 32 of the pause mechanism 30 is movably assembled in the guide sleeve 31, whereby the stop column 321 of the stopper member 32 is movable within the column space 313 of the guide sleeve 31 and thus the stop blocks **321*b* of the stopper member 32 are movable within the locating ring space 314 of the guide sleeve 31. Accordingly, the stop blocks 321*b* are movable between the initial locating sections 314*a*, the stop locating sections 314*b* and the communicating ring section 314*c* of the locating ring space 314. When the stop column 321 is positioned in the column space 313, the stop rod 322 of the stopper member 32 passes through the cap body 312 of the guide sleeve 31, whereby the stopper member 32 is partially positioned outside the column space 313**.

Figure 8:
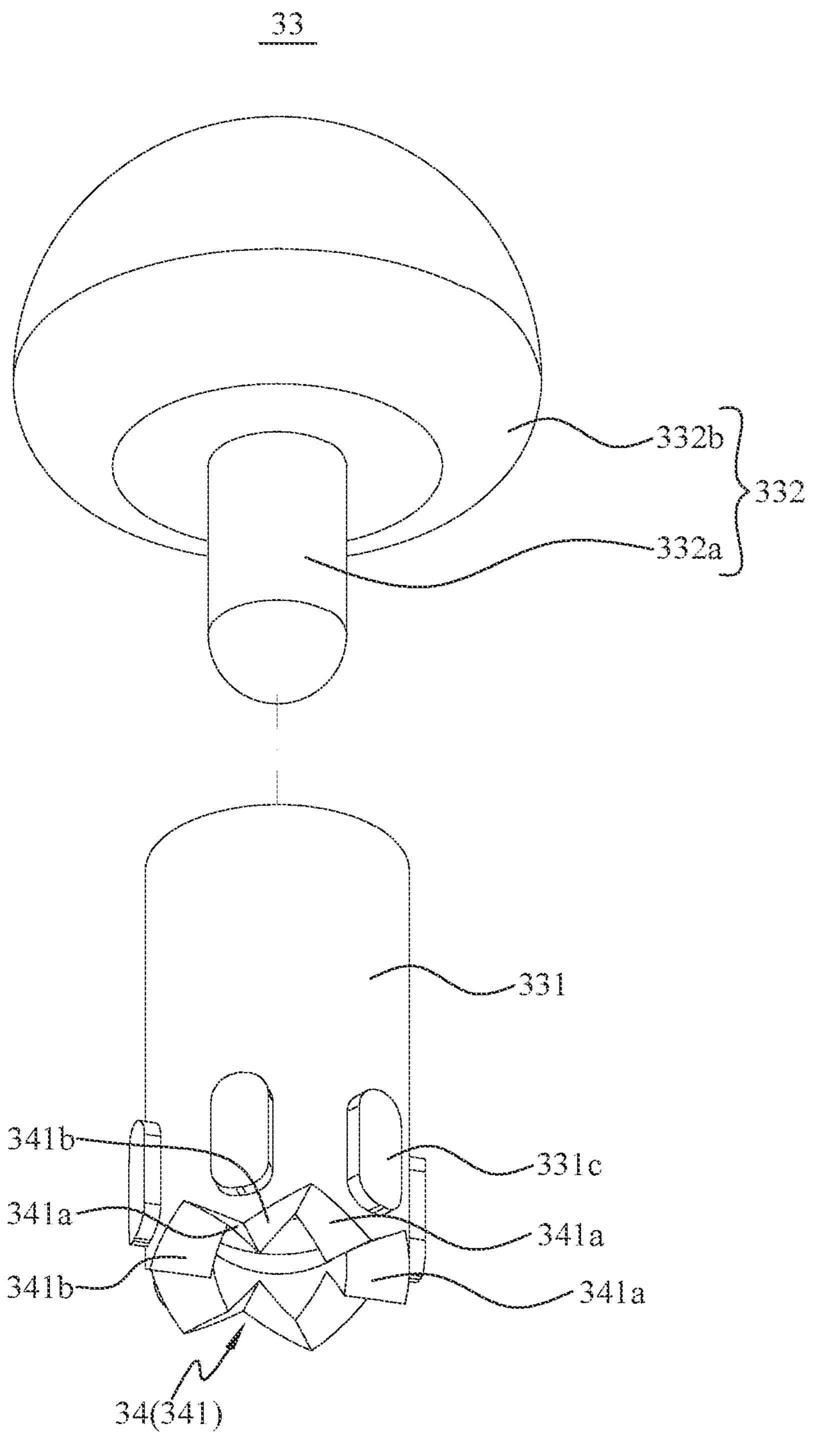
FIG. 8 is a perspective exploded view of the pushbutton of the music box of the present invention.
Figure 9:
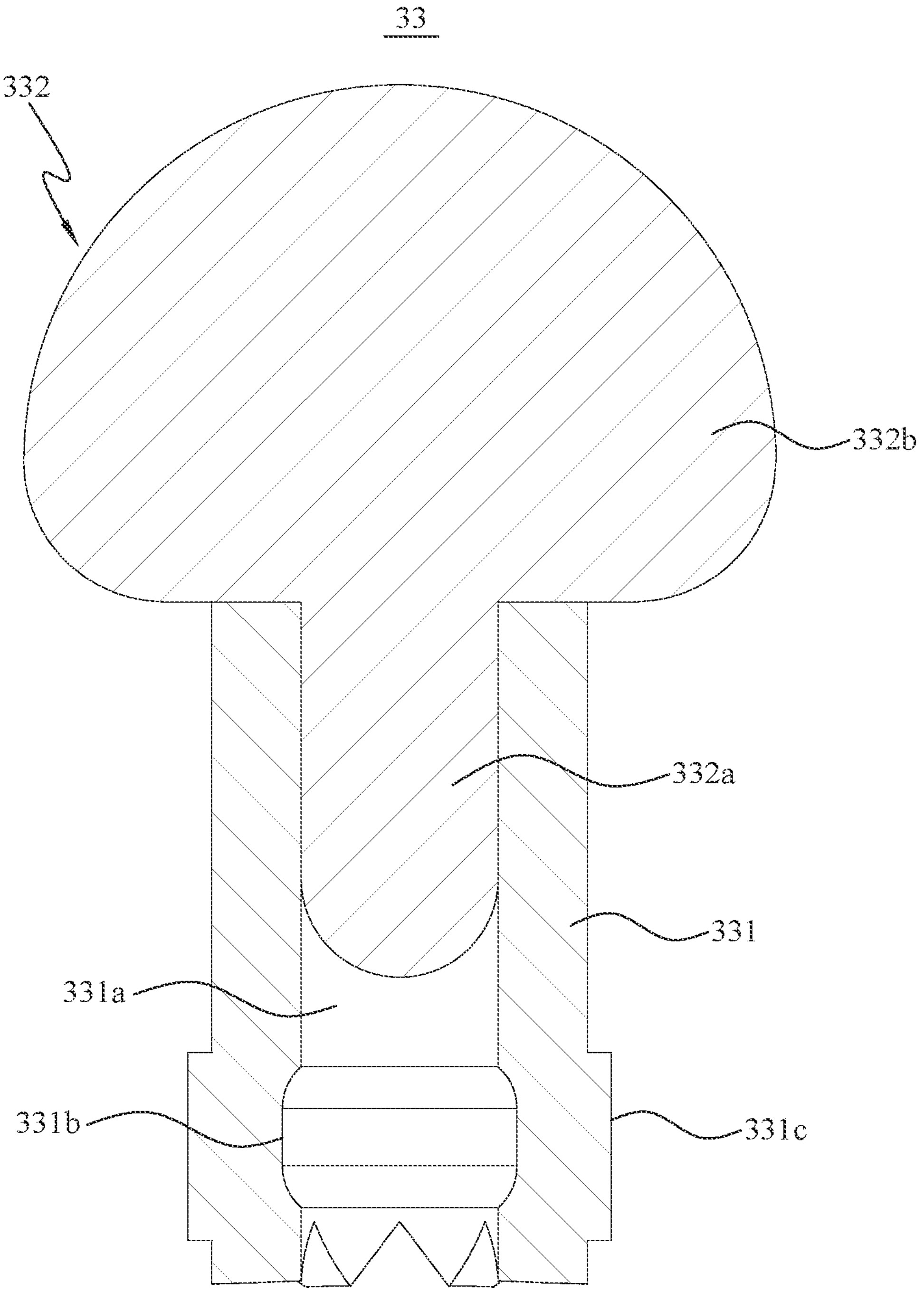
FIG. 9 is a sectional view of the pushbutton of the music box of the present invention.

Please now refer to FIGS. 4, 8 and 9. The pushbutton 33 of the pause mechanism 30 includes a push member 311 and a press member 332. The push member 331 is formed with an internal engagement space **331*a* passing through the push member 331 from an upper end of the push member 331 to a lower end of the push member 331, and a transverse engagement groove 331*b* recessed from the engagement space 331*a*. In addition, a plurality of restriction blocks 331*c* are annular arranged on an outer circumference of the push member 331 at equal intervals. A part of the press member 332 is positioned in the engagement space 331*a* as a press stem 332*a*, while the remaining part of the press member 332 is positioned outside the engagement space 331*a* as a press head 332*b*. In a preferred embodiment, the press stem 332*a* is plugged in the engagement space 331*a* of the push member 331** by press fit.

As shown in the drawings, the pushbutton 33 of the pause mechanism 30 is movably connected with the guide sleeve 31 of the pause mechanism 30, whereby both the push member 331 and the press member 332 of the pushbutton 33 are movable relative to the guide sleeve 31 of the pause mechanism 30. When the pushbutton 33 is movably connected with the guide sleeve 31, the push member 331 of the pushbutton 33 is positioned in the column space 313 of the guide sleeve 31 and the restriction blocks **331*c* of the push member 331 are one-on-one respectively positioned in the restriction grooves 315 of the guide sleeve 31, whereby the restriction blocks 331*c* can move within the restriction grooves 315. Also, the engagement arms 321*c* of the stopper member 32 extend into the engagement space 331*a* of the push member 331, whereby the engagement arms 321*c* are positioned in the engagement space 331*a* with the engagement blocks 321*d* of the stopper member 32 positioned in the engagement groove 331*b* of the push member 331. In this embodiment, the restriction blocks 331*c* are positioned in the restriction grooves 315 so that the restriction grooves 315 and the restriction blocks 331*c* together restrict the pushbutton 33 to only linearly move relative to the guide sleeve 31 in the direction of Z-axis. In addition, during the process of fitting of the two engagement arms 321*c* into the engagement space 331*a*, the push member 331 will compress the two engagement arms 321*c*, whereby the two engagement arms 321*c*** are deformed to get closer to each other.

Please now refer to FIGS. 4, 7 and 8. The guide assembly 34 of the pause mechanism 30 is formed between the stop column 321 of the stopper member 32 and the push member 331 of the pushbutton 33. In addition, the guide assembly 34 has a first guide section 341 disposed on the push member 331 and a second guide section 342 disposed on the stop column 321. In this embodiment, the first guide section 341 is in the form of a recessed structure and has a plurality of first guide planes **341*a* and a plurality of first stop planes 341*b*. The first guide planes 341*a* and the first stop planes 341*b* are annularly alternately arranged along the configuration of the push member 331, whereby there is a first guide plane 341*a* between each two adjacent first stop planes 341*b*, that is, two ends of each first guide plane 341*a* are respectively in adjacency to two adjacent first stop planes 341*b*. In addition, all of the first guide planes 341*a* and all of the first stop planes 341*b* are inclined planes. The first guide planes 341*a* are inclined in a direction, which is different from an inclination direction of the first stop planes 341*b*. The second guide section 342 is in the form of a raised structure and has a plurality of second guide planes 342*a* and a plurality of second stop planes 342*b*. The second guide planes 342*a* and the second stop planes 342*b* are annularly alternately arranged along the configuration of the stop column 321, whereby there is a second stop plane 342*b* between each two adjacent second guide planes 342*a*, that is, two ends of each second guide plane 342*a* are respectively in adjacency to two adjacent second stop planes 342*b*. When the engagement arms 321*c* of the stopper member 32 are fitted into the engagement space 331*a* of the push member 331, the first guide planes 341*a* are respectively one-on-one in contact with the second guide planes 342*a*, while the first stop planes 341*b* are respectively one-on-one in contact with the second stop planes 342*b***.

Please further refer to FIGS. 4, 7 and 8. The restoring spring 35 of the pause mechanism 30 is disposed between the cap body 312 of the guide sleeve 31 and the stop column 321 of the stopper member 32. One end of the restoring spring 35 abuts against the cap body 312, while the other end of the restoring spring 35 abuts against the stop column 321. When the restoring spring 35 is positioned between the cap body 312 and the stop column 321, the restoring spring 35 is compressed between the cap body 312 and the stop column 321, whereby the restoring spring 35 is deformed and the total length of the restoring spring 35 is shortened.

In this case, the restoring spring 35 applies a push force to the stopper member 32 for pushing the same.

Figure 10A:
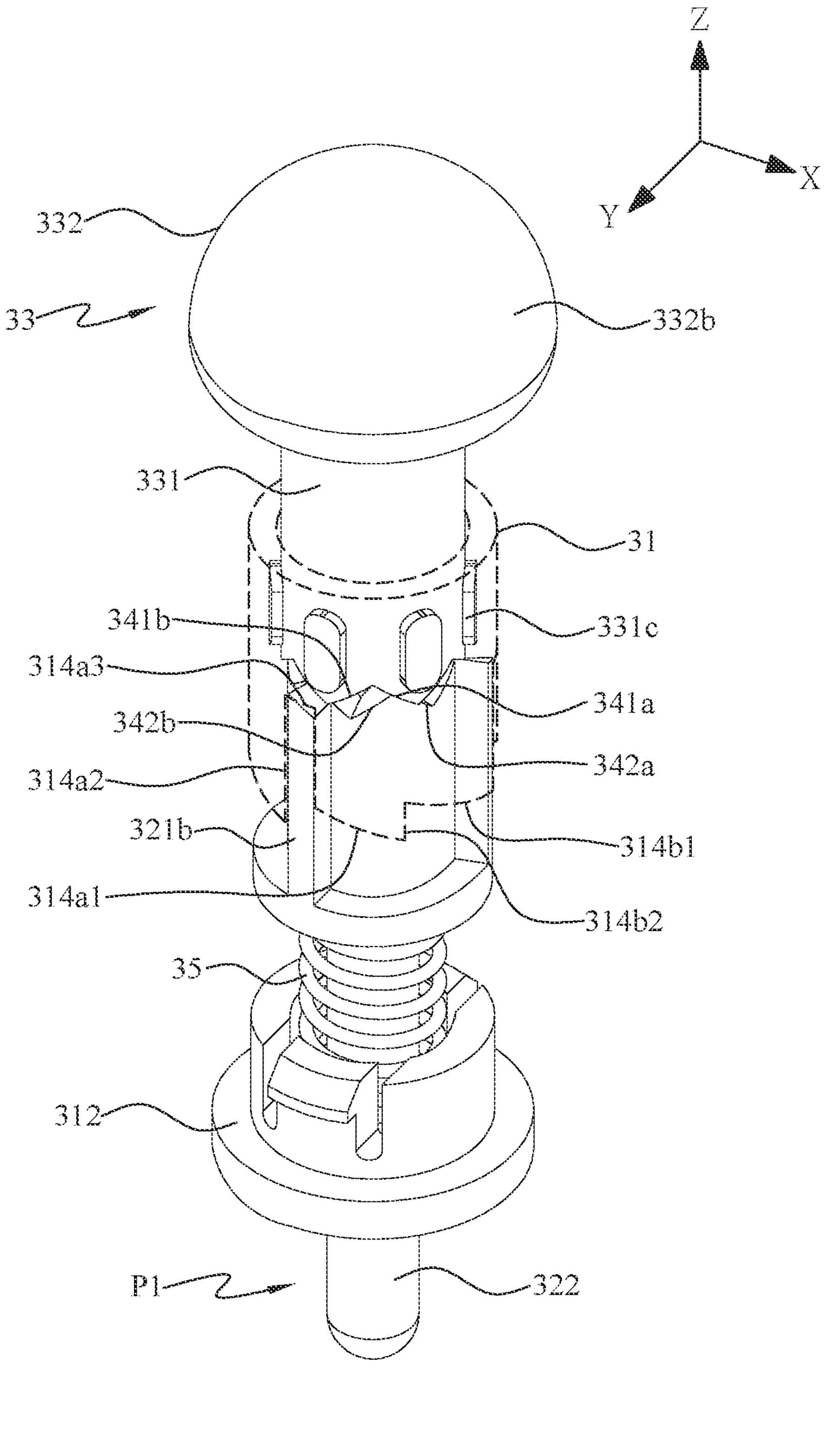
FIG. 10A is a perspective view showing that the stopper member is positioned in a standby position.

Please refer to FIGS. 10A to 10D, which show that the pause mechanism 30 is used to make the clockwork spring 21 of the sounding mechanism 20 pause from rotating. First, as shown in FIG. 10A, the stop blocks 321*b* of the stopper member 32 are positioned in the initial locating sections 314*a* of the guide sleeve 31. Moreover, by means of the restoring spring 35 of the pause mechanism 30, the stop blocks 321*b* keep in contact with the stopping recesses 314*a*3 of the initial locating sections 314*a*, whereby the stop rod 322 of the stopper member 32 is positioned in a standby position P1. When the stop rod 322 is positioned in the standby position P1, the first guide planes 341*a* of the first guide section 341 are in contact with the second guide planes 342*a* of the second guide section 342. At the same time, the first stop planes 341*b* of the first guide section 341 and the second stop planes 342*b* of the second guide section 342 are arranged at intervals.

Figure 10B:
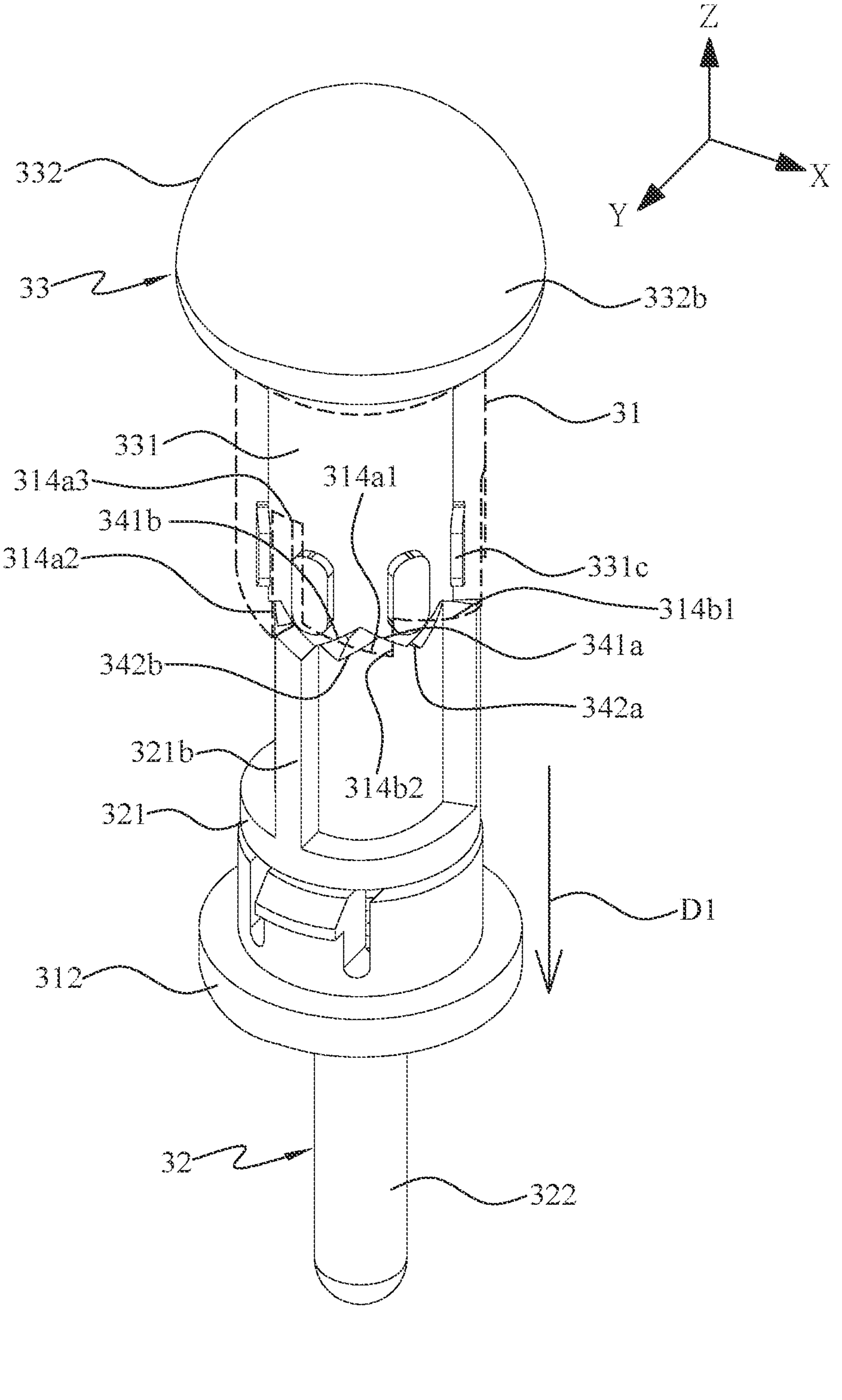
FIG. 10B is a perspective view showing that the stop blocks are moved from the initial locating sections toward the communicating ring section.

Please now refer to FIG. 10B. When a user presses the pushbutton 33 of the pause mechanism 30 to make the press head 332*b* of the press member 332 gradually get closer to the cylindrical body 311 of the guide sleeve 31, the restriction blocks 331*c* of the pushbutton 33 are pushed to one-on-one move downward within the restriction grooves 315 of the guide sleeve 31 along Z-axis. When the press head 332*b* gets closer to the cylindrical body 311, the pushbutton 33 pushes the stopper member 32 of the pause mechanism 30 to linearly move in a forward direction D1 in parallel to the Z-axis, whereby the stop blocks 321*b* of the stopper member 32 are moved from the initial locating sections 314*a* of the locating ring space 314 toward the communicating ring section 314*c* of the locating ring space 314 so that the stop blocks 321*b* are gradually moved away from the stopping recesses 314*a*3 of the initial locating section 314*a*.

Figure 10C:
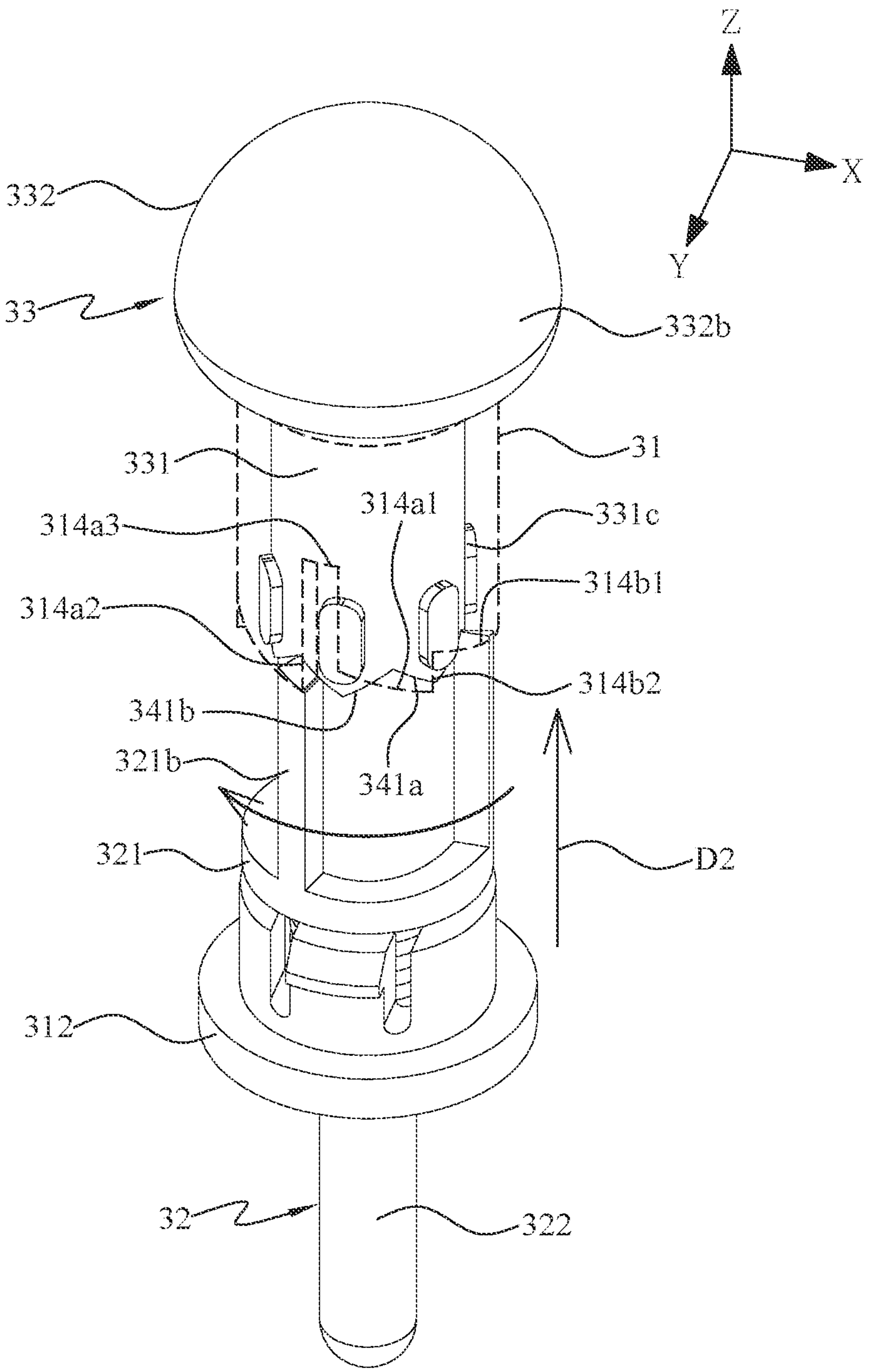
FIG. 10C is a perspective view showing that a stop column is rotated and the stop blocks get into contact with the stop guiding incline surfaces.

Please refer to FIG. 10C. When the entire stop blocks 321*b* of the stopper member 32 are positioned in the communicating ring section 314*c* of the locating ring space 314, the first guide planes 341*a* of the first guide section 341 are in contact with the second guide planes 342*a* of the second guide section 342 and the restoring spring 35 applies the push force to the stop column 321 of the stopper member 32, whereby the stop column 321 of the stopper member 32 is rotated around the Z-axis and the second stop planes 342*b* of the second guide section 342 are moved toward the first stop planes 341*b* of the first guide section 341 until the second stop planes 342*b* get into contact with the first stop planes 341*b*. During the rotation of the stop column 321 around the Z-axis, the stop blocks 321*b* are moved within the communicating ring section 314*c* to get close to the stop locating sections 314*b*. At the same time, under the push force of the restoring spring 35, the stop column 321 can move in a backward direction D2 reverse to the forward direction D1, whereby the stop blocks 321*b* move from the communicating ring section 314*c* into the stop locating sections 314*b*. When the first stop planes 341*b* and the second stop planes 342*b* contact each other, the stop blocks 321*b* are in contact with the stop guiding incline surfaces 314*b*1 of the stop locating section 314*b*.

Figure 10D:
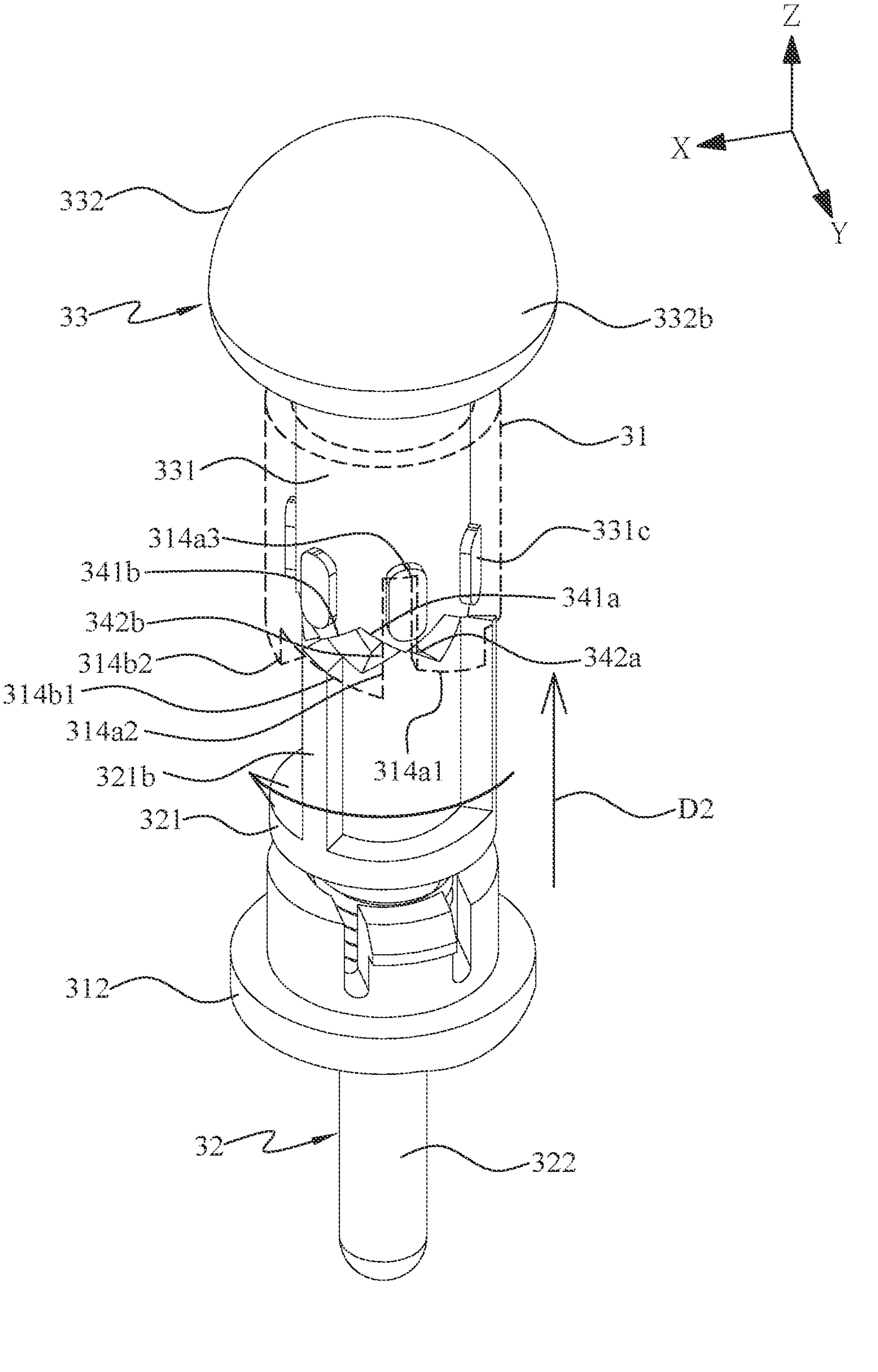
FIG. 10D is a perspective view showing that the stop column is further rotated to make the first stopping wall surfaces become out of contact with the second stopping wall surfaces.
Figure 10E:
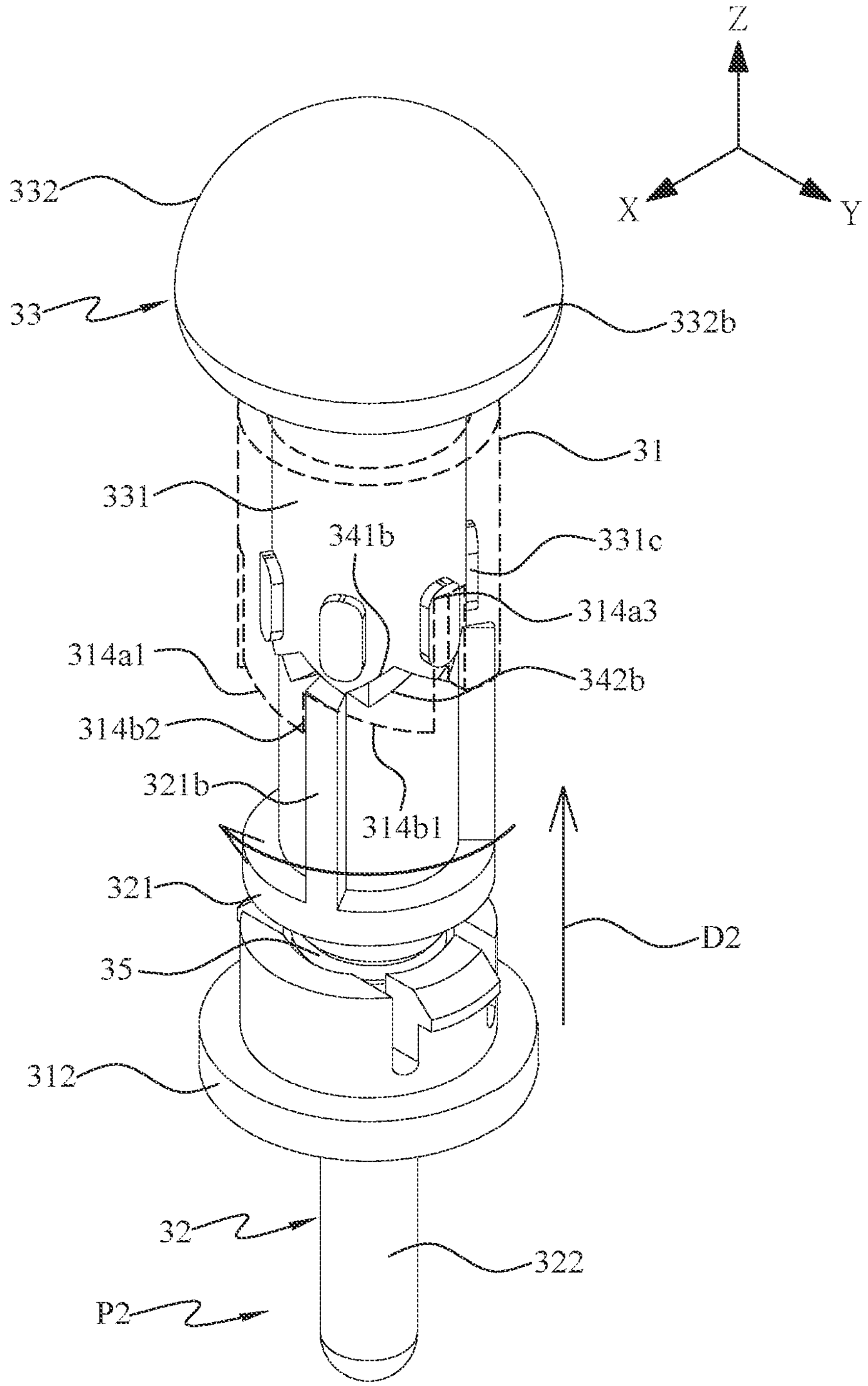
FIG. 10E is a perspective view showing that the stopper member is positioned in an abutting position.

Please refer to FIGS. 10D and 10E. After the stop blocks 321*b* of the stopper member 32 touch the stop guiding incline surfaces 314*b*1 of the stop locating sections 314*b*, the user releases the pushbutton 33 of the pause mechanism 30. At this time, the restoring spring 35 of the pause mechanism 30 pushes the stopper member 32 to move in the backward direction D2, whereby the stop blocks 321*b* move along the stop guiding incline surfaces 314*b*1 toward the stopping wall surfaces 314*b*2 of the stop locating sections 314*b* and the stop guiding incline surfaces 314*b*1 guide the stop blocks 321*b* to the stopping wall surfaces 314*b*2. During the moving process of the stop blocks 321*b* along the stop guiding incline surfaces 314*b*1, the stop column 321 of the stopper member 32 is continuously rotated around the Z-axis relative to the guide sleeve 31. At this time, the first stop planes 341*b* of the first guide section 341 keep in contact with the second stop planes 342*b* of the second guide section 342, while the second guide planes 342*a* of the second guide section 342 are gradually moved away from the first guide planes 341*a* of the first guide section 341. In this case, the contact area between the first stop planes 341*b* and the second stop plane 342*b* is gradually reduced. When the first stop planes 341*b* become out of contact with the second stop planes 342*b*, each second guide section 342 is aligned with the next first guide section 341. Thereafter, when the stop blocks 321*b* contact the stop planes 314*b*2, the stop column 321 of the stopper member 32 stops rotating around the Z-axis. At this time, the stop rod 322 of the stopper member 32 stays in an abutting position P2, whereby the stop rod 322 is partially positioned within the rotational range of the clockwork spring 21 of the sounding mechanism 20. Under such circumstance, the clockwork spring 21 will contact the stop rod 322 and stop rotating. As a result, the pins 221 of the cylinder 22 cannot pluck the comb reed 23 of the sounding mechanism 20 and no sound is emitted.

Figure 11A:
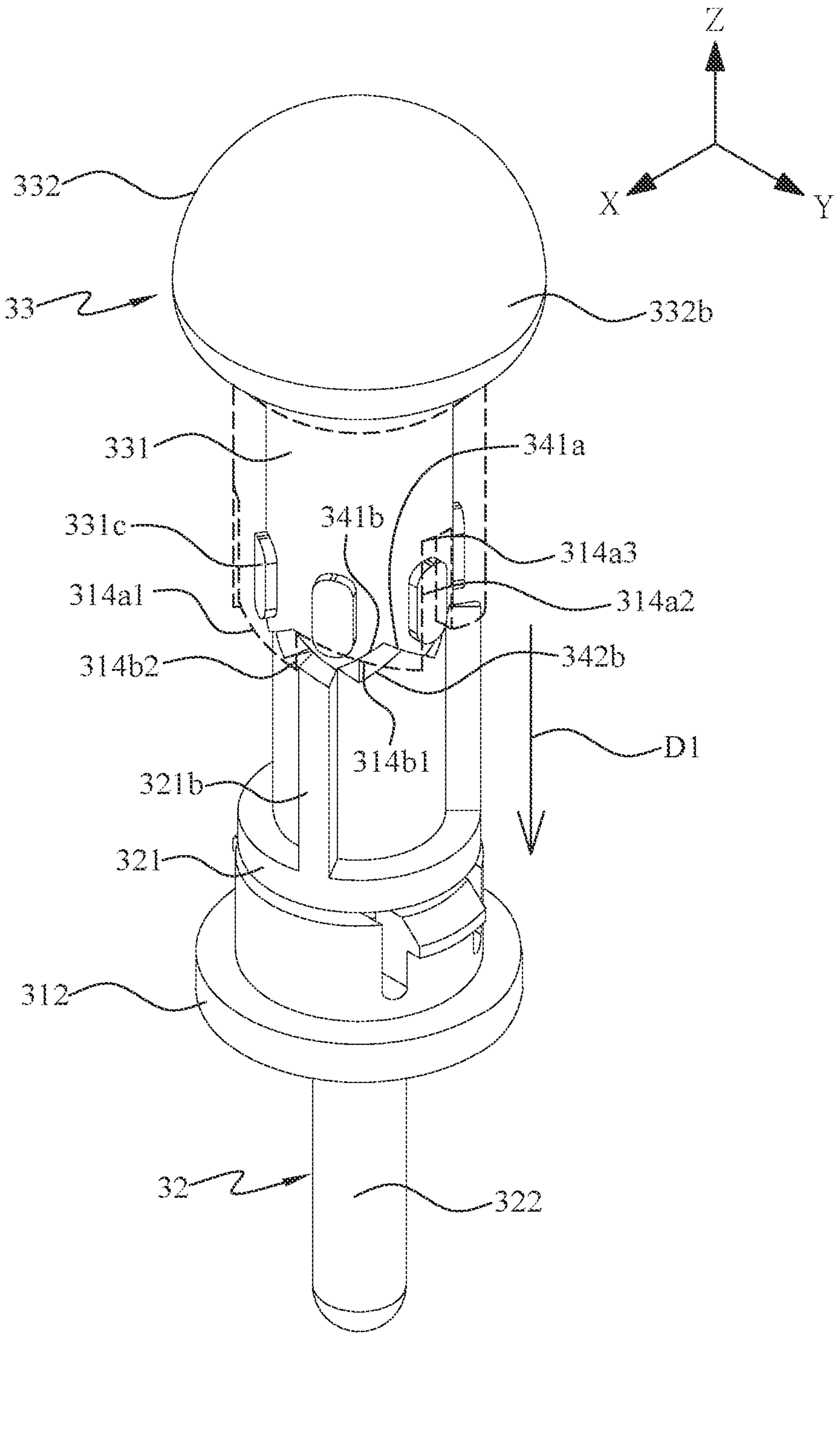
FIG. 11A is a perspective view showing that the stop blocks are moved from the stop locating sections toward the communicating ring section.

Please now refer to FIGS. 11A to 11D, which show that the pause mechanism 30 is used to make the clockwork spring 21 of the sounding mechanism 20 proceed to rotate. First, as shown in FIG. 11A, when the user presses the pushbutton 33 of the pause mechanism 30 again to make the press head 332*b* of the press member 332 gradually get closer to the cylindrical body 311 of the guide sleeve 31, the restriction blocks 331*c* of the pushbutton 33 are pushed to one-on-one move within the restriction grooves 315 of the guide sleeve 31. When the press head 332*b* gets closer to the cylindrical body 311, the pushbutton 33 pushes the stopper member 32 of the pause mechanism 30 to linearly move in the forward direction D1, whereby the stop blocks 321*b* of the stopper member 32 are moved from the stop locating sections 314*b* of the locating ring space 314 toward the communicating ring section 314*c* of the locating ring space 314.

Figure 11B:
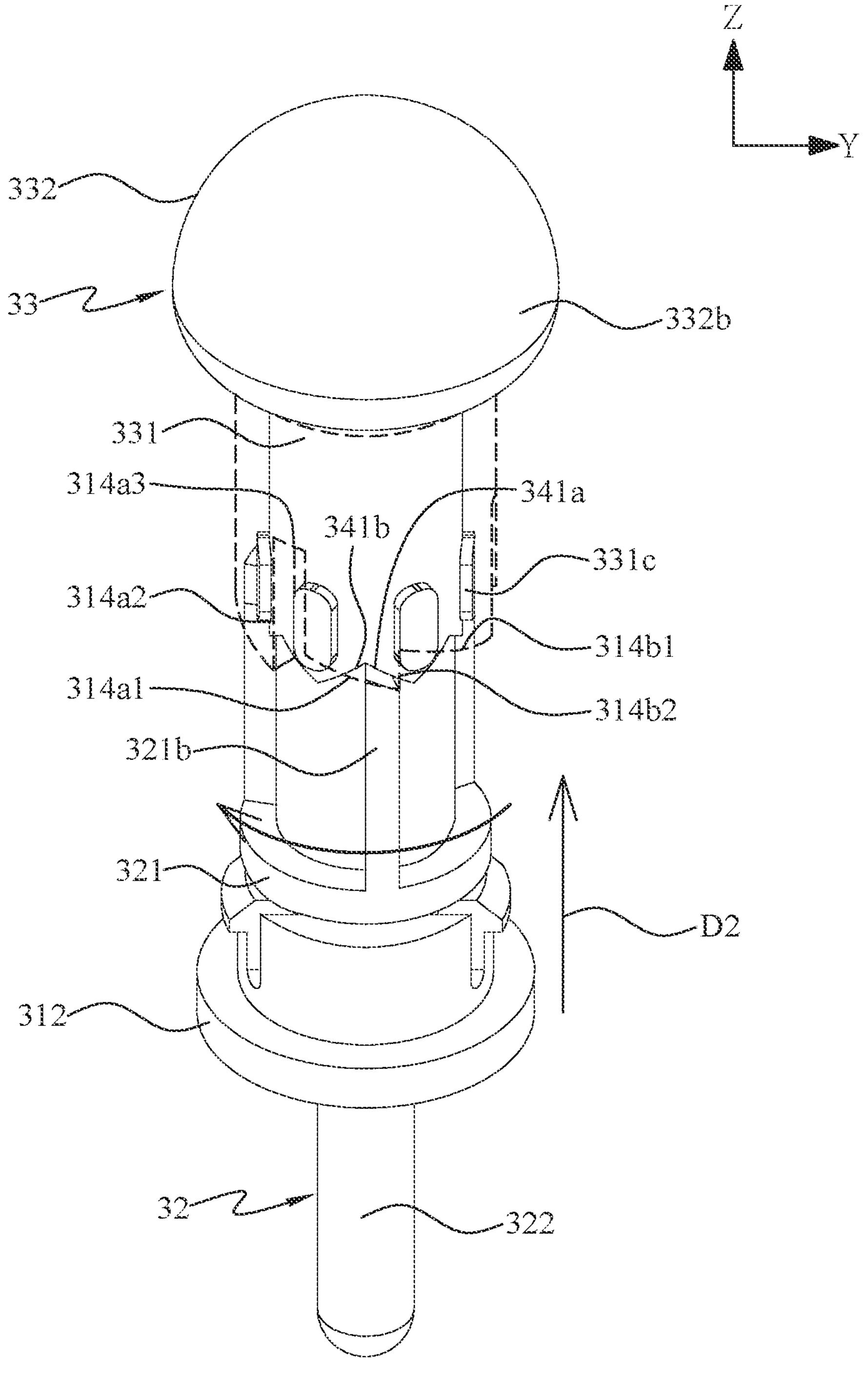
FIG. 11B is a perspective view showing that the stop column is rotated and the stop blocks get into contact with the guiding incline surfaces.

Please refer to FIG. 11B. When the entire stop blocks 321*b* of the stopper member 32 are positioned in the communicating ring section 314*c* of the locating ring space 314, the first guide planes 341*a* of the first guide section 341 are in contact with the second guide planes 342*a* of the second guide section 342 and the restoring spring 35 applies the push force to the stop column 321 of the stopper member 32, whereby the stop column 321 of the stopper member 32 is rotated around the Z-axis and the second stop planes 342*b* of the second guide section 342 are moved toward the first stop planes 341*b* of the first guide section 341 until the second stop planes 342*b* get into contact with the first stop planes 341*b*. During the rotation of the stop column 321 around the Z-axis, the stop blocks 321*b* are moved within the communicating ring section 314*c* to get close to the initial locating sections 314*a*. At the same time, under the push force of the restoring spring 35, the stop column 321 can move in the backward direction D2, whereby the stop blocks 321*b* move from the communicating ring section 314*c* into the initial locating sections 314*a*. When the first stop planes 341*b* and the second stop planes 342*b* contact each other, the stop blocks 321*b* are in contact with the guiding incline surfaces 314*a*1 of the initial locating section 314*a*.

Figure 11C:
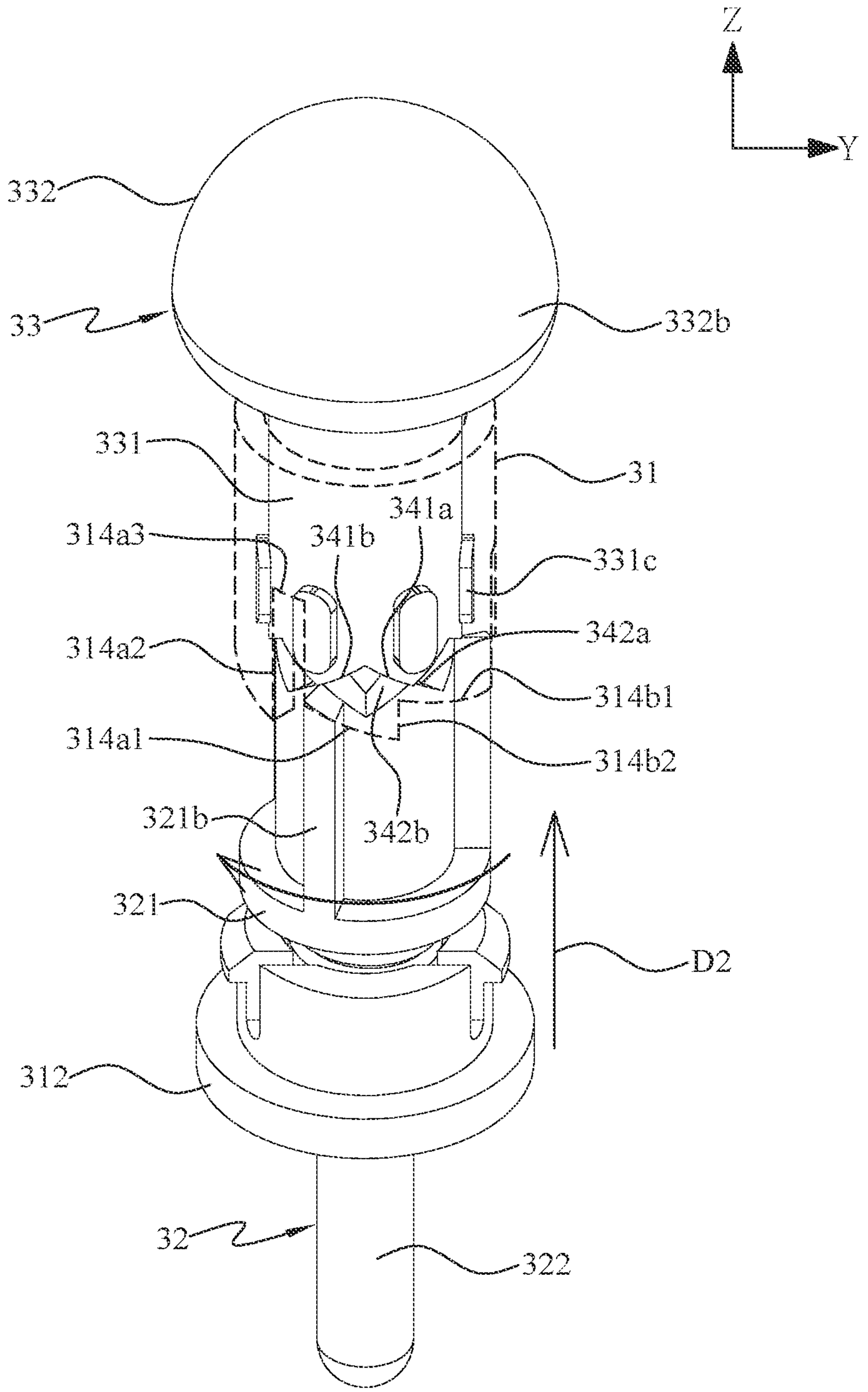
FIG. 11C is a perspective view showing that the stop column is further rotated to make the first stopping wall surfaces become out of contact with the second stopping wall surfaces.
Figure 11D:
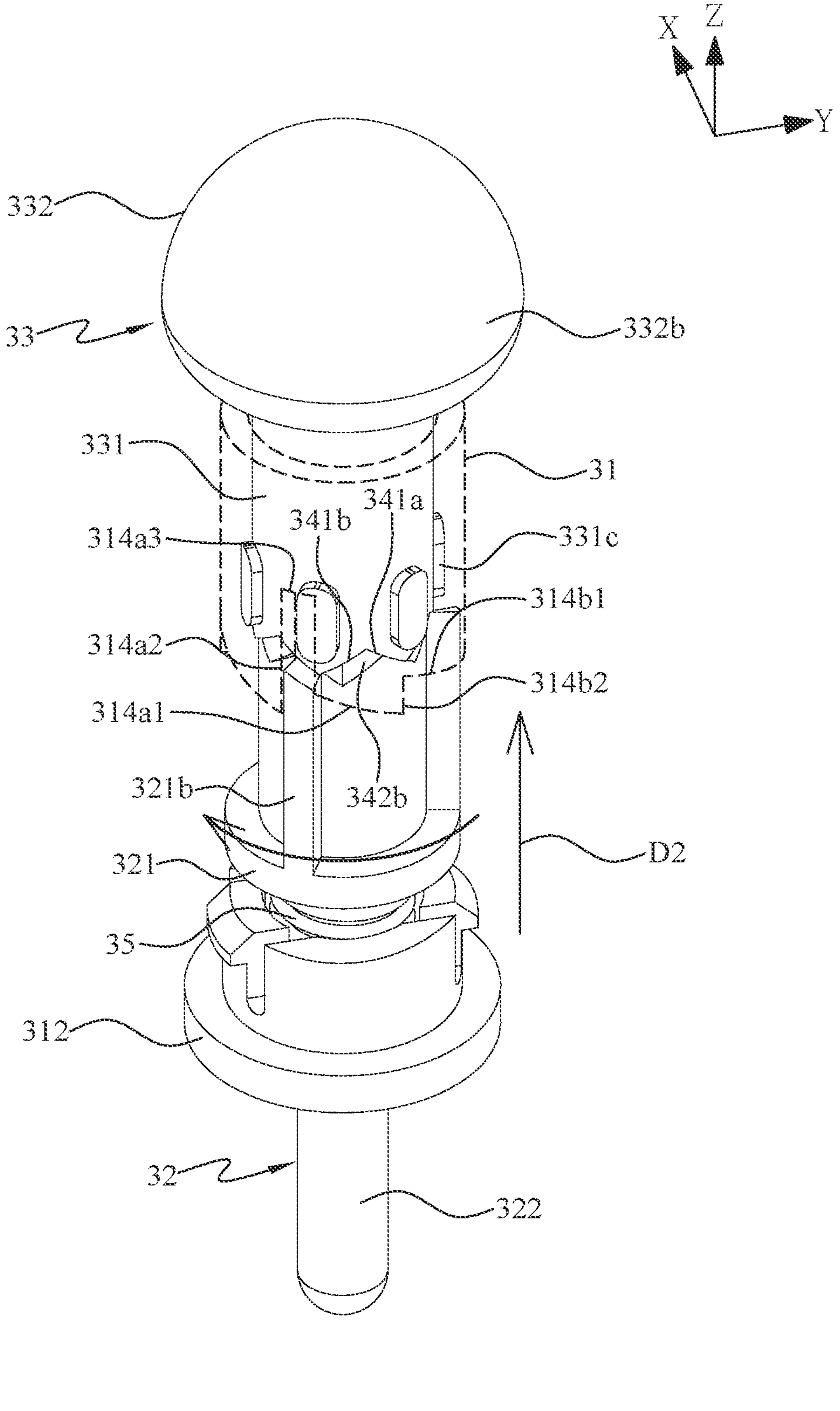
FIG. 11D is a perspective view showing that the stop blocks contact the blocking wall surfaces.
Figure 11E:
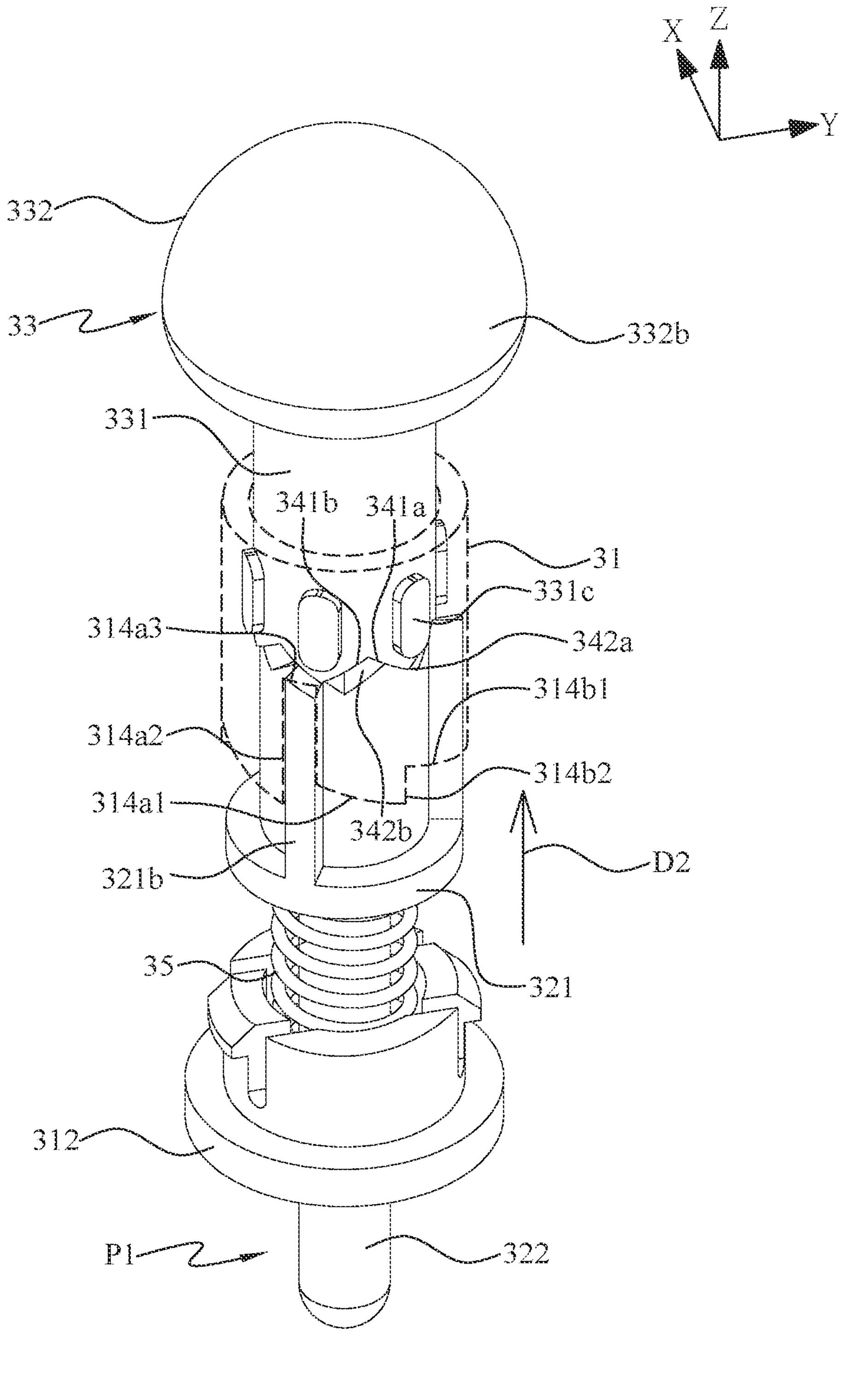
FIG. 11E is a perspective view showing that the stopper member is moved back to the standby position.

Please refer to FIGS. 11C and 11D. After the stop blocks 321*b* of the stopper member 32 touch the guiding incline surfaces 314*a*1 of the initial locating sections 314*a*, the user releases the pushbutton 33 of the pause mechanism 30. At this time, the restoring spring 35 of the pause mechanism 30 pushes the stopper member 32 to move in the backward direction D2, whereby the stop blocks 321*b* move along the guiding incline surfaces 314*a*1 toward the blocking wall surfaces 314*a*2 of the initial locating sections 314*a* and the guiding incline surfaces 314*a*1 guide the stop blocks 321*b* to the blocking wall surfaces 314*a*2. During the moving process of the stop blocks 321*b* along the guiding incline surfaces 314*a*1, the stop column 321 of the stopper member 32 is continuously rotated around the Z-axis relative to the guide sleeve 31. At this time, the first stop planes 341*b* of the first guide section 341 keep in contact with the second stop planes 342*b* of the second guide section 342, while the second guide planes 342*a* of the second guide section 342 are gradually moved away from the first guide planes 341*a* of the first guide section 341. In this case, the contact area between the first stop planes 341*b* and the second stop plane 342*b* is gradually reduced. When the first stop planes 341*b* become out of contact with the second stop planes 342*b*, each second guide section 342 is aligned with the next first guide section 341. Thereafter, when the stop blocks 321*b* contact the blocking wall surfaces 314*a*2, the stop column 321 of the stopper member 32 stops rotating around the Z-axis.

Please refer to FIG. 11D. After the stop blocks 321*b* of the stopper member 32 touch the blocking wall surfaces 314*a*2 of the initial locating sections 314*a*, the restoring spring 35 of the pause mechanism 30 further pushes the stopper member 32 to move in the backward direction D2, whereby the stop blocks 321*b* move along the blocking wall surfaces 314*a*2 toward the stopping recesses 314*a*3 of the initial locating sections 314*a* and the blocking wall surfaces 314*a*2 guide the stop blocks 321*b* to the stopping recesses 314*a*3. When the stop blocks 321*b* get into contact with the stopping recesses 314*a*3 under the push force of the restoring spring 35, the stop rod 322 of the stopper member 32 is positioned in the standby position P1 out of the rotational range of the clockwork spring 21 of the sounding mechanism 20. Under such circumstance, the clockwork spring 21 will not contact the stop rod 322 and can proceed to rotate. As a result, the pins 221 of the cylinder 22 can pluck the comb reed 23 of the sounding mechanism 20 to emit sounds.

What is claimed is:

1. A music box, comprising:

a box body;

a sounding mechanism mounted in the box body and having a clockwork spring, a sounding cylinder and a comb reed, the clockwork spring being rotatable to drive the cylinder to pluck the comb reed, so that the comb reed being capable of emitting sounds and playing music; and a pause mechanism for making the clockwork spring pause from rotating;

characterized in that the pause mechanism including:

a guide sleeve connected with the box body, a column space and a locating ring space around the column space being defined in the guide sleeve, a plurality of initial locating sections and a plurality of stop locating sections being alternately arranged in the locating ring space for surrounding the column space, and a communicating ring section of the locating ring space being in communication with the initial locating sections and the stop locating sections;

a stopper member movably assembled in the column space, the stopper member is capable of being moved and rotated as well as having a stop block, and the stop block is movable between the initial locating sections, the stop locating sections and the communicating ring section; the stop block being selectively stopped by one of the initial locating section and the stop locating section, so that the stopper member is kept in an abutting position to restrict the clockwork spring from rotating or in a standby position to permit the clockwork spring to rotate;

a pushbutton movably assembled in the column space for pushing the stopper member to move in a forward direction, whereby the stop block being capable of moving from one of the initial locating section and the stop locating section to the communicating ring section;

a guide assembly having a first guide section forming on the stopper member and a second guide section forming on the pushbutton; the first guide section being pushed by the second guide section for rotating the stopper member, so that the stop block will be moved from one of the initial locating section and the stop locating section into the other of the initial locating section and the stop locating section through the communicating ring section; and a restoring spring disposed between the guide sleeve and the stopper member for pushing the stopper member to move in a backward direction reverse to the forward direction, so that the stop block is capable of being moved from the communicating ring section to one of the initial locating section and the stop locating section.

2. The music box as claimed in claim 1, wherein each of the initial locating sections has a stopping recess for making the stop block stay in the standby position, a blocking wall surface forming adjacent to one side of the stopping recess and a guiding incline surface forming adjacent to another side of the stopping recess, when the stop block is contact with the guiding incline surface, the stop block will be moved by the guiding incline surface toward the guiding incline surface, then the stop block is blocked by the blocking wall surface and is moved into the stopping recess.

3. The music box as claimed in claim 2, wherein each of the stop locating sections has a stopping wall surface for making the stop block stay in the abutting position and a stop guiding incline surface for moving the stop block toward the stopping wall surface: a height of the stopping wall surface is lower than that of the stopping recess, and two ends of stopping wall surface being respectively adjacent to the guiding incline surface and the stop guiding incline surface.

4. The music box as claimed in claim 1, wherein the guide sleeve further has a restriction groove in communication with both the column space and the locating ring space, and a restriction block being disposed on the pushbutton for entering the restriction groove, so that the restriction groove is capable of being cooperated with the restriction block for restricting the pushbutton to move linearly relative to the guide sleeve.

5. The music box as claimed in claim 1, wherein two engagement arms are extended from the stopper member for inserting the pushbutton, and an engagement block is protruded from the engagement arms; an engagement space being formed in the pushbutton, and an engagement groove being recessed from the engagement space; whereby the engagement arms can be deformed to fit into the engagement space to make the engagement block engaged in the engagement groove.

* * * * *